C. W. STARKER.
DYNAMO ELECTRIC MACHINE.
APPLICATION FILED NOV. 3, 1916.

1,362,050.

Patented Dec. 14, 1920.
4 SHEETS—SHEET 1.

WITNESSES:
Fred. A. Lind.
W. R. Coley

INVENTOR
Charles W. Starker
BY
Wesley G. Carr
ATTORNEY

C. W. STARKER.
DYNAMO ELECTRIC MACHINE.
APPLICATION FILED NOV. 3, 1916.

1,362,050.

Patented Dec. 14, 1920.
4 SHEETS—SHEET 4.

WITNESSES:
Fred. A. Lind.
W. R. Coley

INVENTOR
Charles W. Starker
BY
Wesley G. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,362,050. Specification of Letters Patent. Patented Dec. 14, 1920.

Application filed November 3, 1916. Serial No. 129,272.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines and especially to certain structural features of the frames of railway motors and the like.

One object of my invention is to provide an apparatus of the above-indicated class which shall readily and inexpensively permit of a variation of gear-center-distance; that is, the distance between the centers of the armature shaft and the axle, and a variation of road clearance; that is, the distance between the bottom of the motor frame and the roadbed, to whatever degree of variation may be desired, while maintaining substantially identical motor parts and merely varying the arrangement thereof.

More specifically stated, it is an object of my invention to provide a dynamo-electric machine frame, together with an axle-bracket of familiar form, and an arrangement of polar projection members which are either initially constructed of different lengths or are built up to provide different effective lengths, whereby the center of the armature axle is shifted a predetermined degree to the one or the other side of, or above or below, the geometrical center of the main incasing member of the frame.

Figure 1:
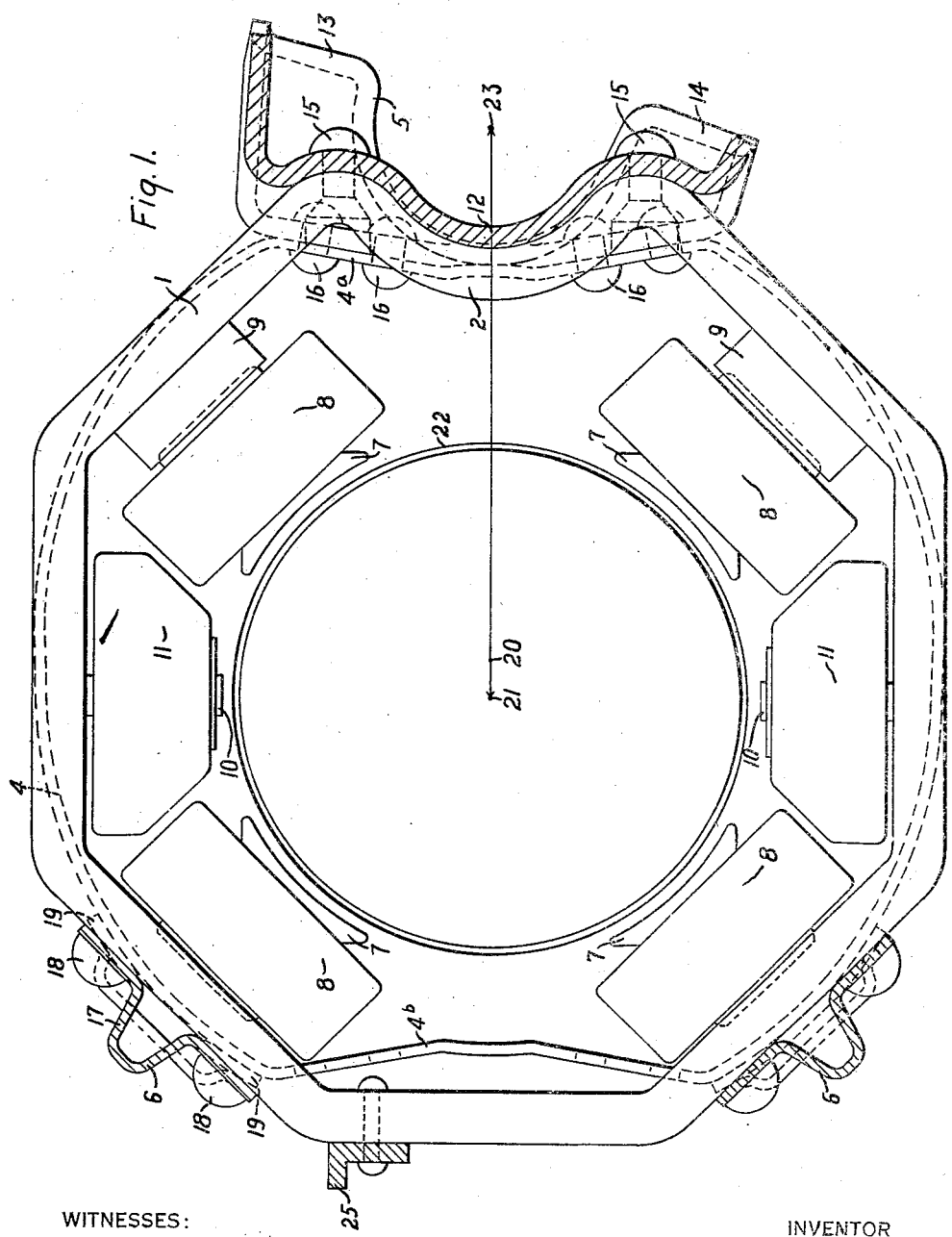
Figure 2:
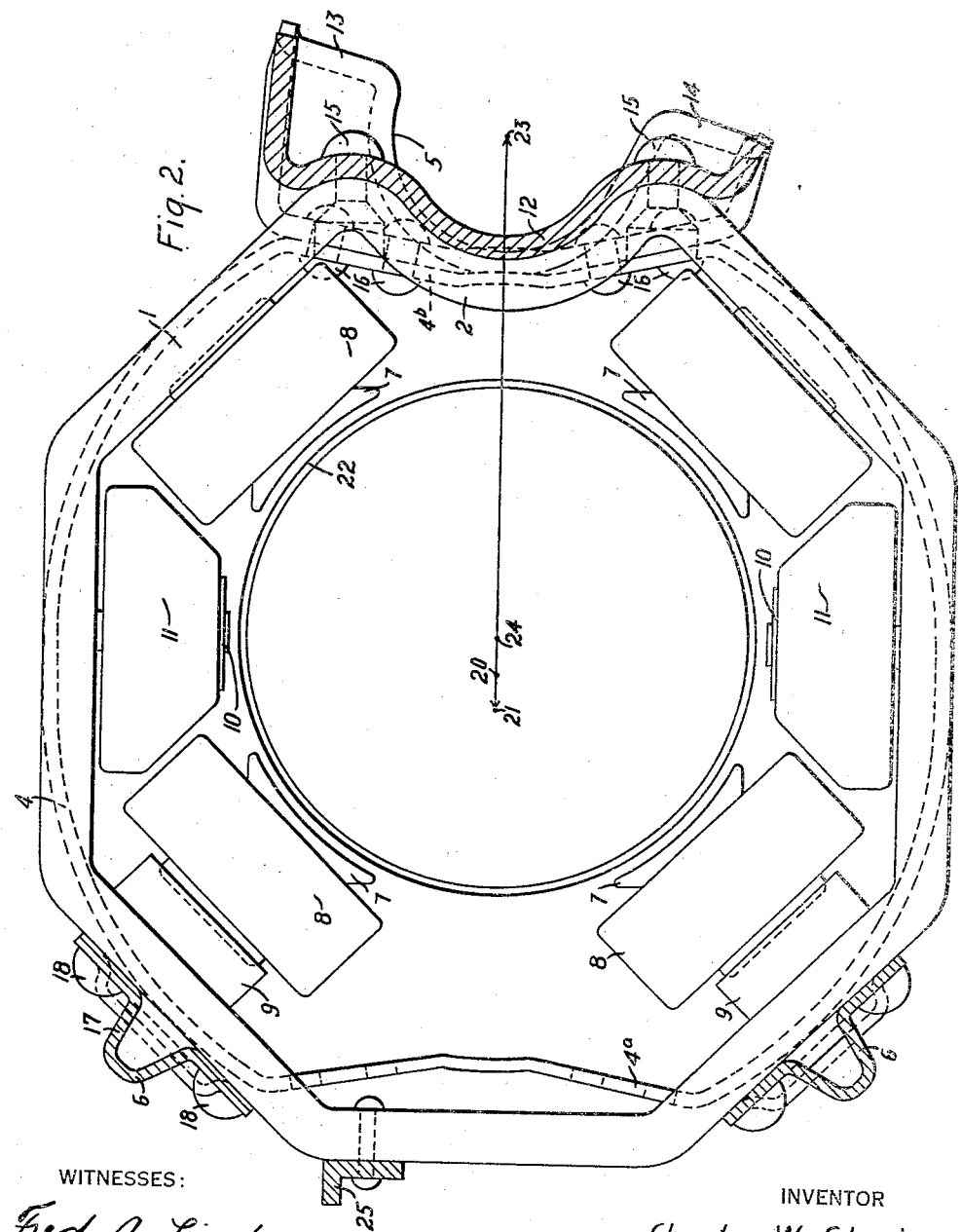
Figure 3:
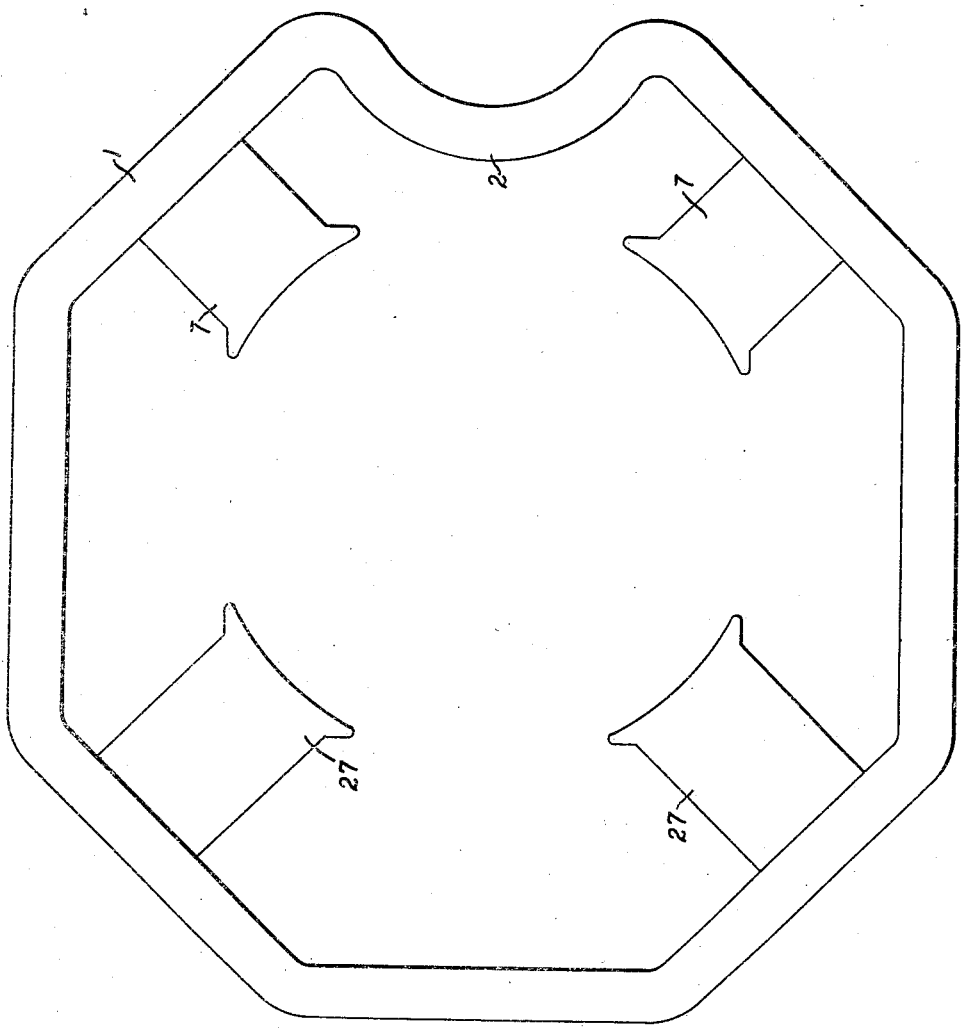
Figure 4:
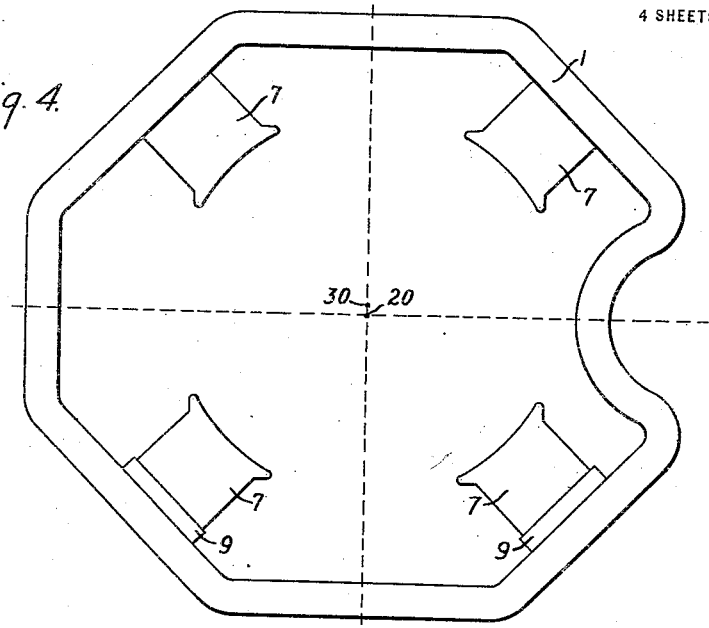
Figure 5:
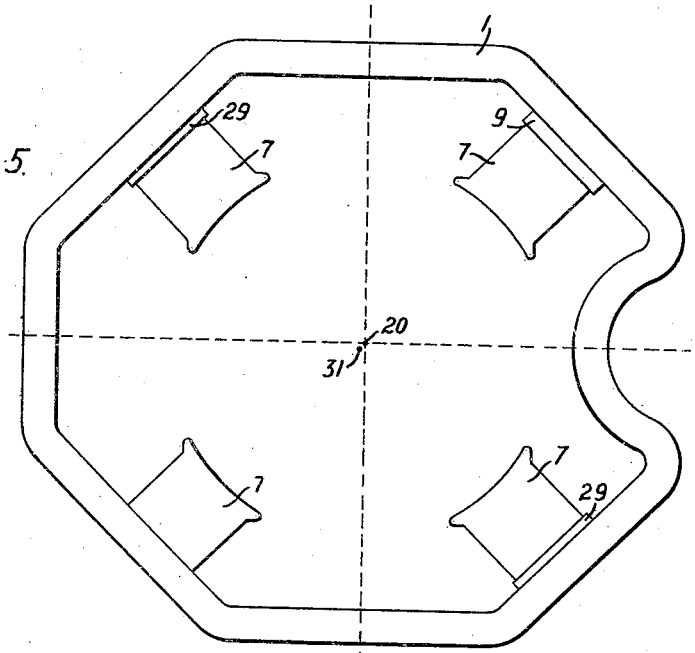

My invention may best be understood by reference to the accompanying drawings, wherein Figure 1 is a view, in transverse section, of a dynamo-electric machine frame constructed and arranged in accordance with one phase of my invention; Fig. 2 is a similar view disclosing a different arrangement of the same motor parts that are shown in Fig. 1 to provide a different gear-center-distance of the motor; Fig. 3 is a semi-diagrammatic view corresponding to Fig. 2 and illustrating a further modification of my invention; and Fig. 4 and Fig. 5 are views, similar to Fig. 3, of other modifications of the invention.

Referring to Fig. 1 of the drawings, the structure shown comprises a magnetizable yoke or main incasing member 1, preferably of the customary polygonal form, that is provided with a longitudinally-extending side indentation 2, for a purpose to be described; a pair of similar end-members or end-rings 4, only one of which appears upon the drawings; an axle-bracket 5 that is located within the indentation 2 and is secured to the main incasing member 1, as hereinafter set forth; and a plurality of connecting members or tie-pieces 6 that are adapted, in conjunction with the axle-bracket 5, to suitably mechanically connect the main yoke member and the end-rings.

A plurality of laminated or other suitable main polar projections 7 of identical dimensions are substantially equally spaced within the main incasing member 1, practically at the 45° points thereof, in accordance with customary practice for four-pole motors, and the polar projections are provided with field-magnet coils 8, as is usual. However, between the upper and the lower right-hand polar projections 7 and the corresponding portions of the main incasing member 1, spacing-blocks or filling members 9 are located, thereby causing the adjacent polar projections 7 to extend radially inwardly to a predetermined degree greater than normal, without, in any way, sacrificing the mechanical or electrical characteristics of the machine, since the spacing blocks 9 may also be of laminated material and may be secured to the main incasing member through the agency of the same bolts (not shown) or other connecting means that are usually employed to attach the polar projections to the frame.

If desired, a plurality of interpolar projections 10 may be associated with the upper and the lower horizontal internal faces of the main incasing member 1 and may be provided with field coils 11 of a suitable type.

The general structural features of the motor parts 1, 5 and 6 are not material to my present invention except in so far as they perform certain necessary functions, and only a brief discussion thereof will be necessary for a thorough comprehension of my present invention. For obtaining a more detailed idea of the structural features of the parts in question, reference may be had to Patent No. 1,198,080, granted September 12, 1916, to the Westinghouse Electric & Manufacturing Company upon an application filed by C. W. Starker and Gustav L. S. Kronfeld.

The end-ring 4 is preferably of shallow cupped form, having its edges turned inwardly toward the main incasing member 1 and suitably spaced therefrom. The general cylindrical shape of the end ring is modified on two sides to form substantially flat flanges 4$^a$ and 4$^b$ for purposes of mechanical connection to the axle-bracket 5, as about to be described.

The axle-bracket 5, as well as the end-rings 4 and tie-pieces 6, are preferably formed of pressed-steel, whereby a relatively light-weight machine frame is obtained, as more fully set forth in the above-identified patent. The axle-bracket is provided with a curved intermediate portion 12 that is located within the identation 2 of the main incasing member 1 and also with relatively flat side portions 13 and 14 for the purpose of bolted or other suitable detachable connection to an appropriate axle cap (not shown), in accordance with a familiar practice.

A plurality of rivets 15 are provided for securing the intermediate portion 12 of the axle bracket to the main incasing member 1, while a number of other rivets 16 are provided to mechanically attach the flat portion 4$^a$, in the present instance, of the end-ring 4 to a corresponding flattened portion of the axle-bracket 5.

The tie pieces 6 are provided with one or more stiffening bosses or ribs 17, and a plurality of rivets 18 are located along the sides of the tie pieces to secure them to the main incasing member 1. Furthermore, the end-portions 19 of the tie-pieces are suitably riveted to the adjacent flanged portions of the end-rings 4. Such construction is not herein fully illustrated but will be understood by those skilled in the art, and reference may be had to the above-mentioned patent for further details, if desired.

The purpose of employing the spacing-blocks or filling members 9 is to shift the center of the armature shaft (not shown), in this case a certain horizontal distance to the left of the geometrical center of the main incasing member 1. Graphically illustrated, the point 20 represents such geometrical center of the incasing member 1; that is to say, the point which is symmetrically located with respect to all of the polygonal faces of the main incasing member 1, whereas the point 21 represents a point in the center of the armature shaft or, in other words, the point 21 is symmetrically located with respect to the positions of the polar projections 7 and to the opening 22 of the end-ring 4 which is adapted to receive an armature bearing-housing of any suitable type, as will be understood by those skilled in the art.

It will thus be seen that the effect of the spacing blocks 9 is to shift the center of the armature shaft a predetermined distance to the left of the geometrical center of the main casing member and, taking the point 23 as representing the center of the truck axle (not shown), the gear-center-distance of the machine is represented by the line 21—23.

Referring now to Fig. 2, the various parts illustrated are identical with those shown in Fig. 1, the difference being solely in the arrangement of such parts. Such new arrangement comprises the location of the spacing-blocks 9 between the upper and the lower left-hand polar projections 7 and the respective adjacent portions of the main incasing member 1, while the upper and the lower right-hand polar projections 7 are directly associated with the incasing member. Consequently, in the present instance, the center of the armature shaft (not shown) is shifted a certain degree horizontally to the right of the geometrical center 20 of the main incasing member 1 to the point 24, so that the line 24—23 now represents the decreased gear-center-distance of the rearranged machine frame, and a length equal to the line 24—21 has thus been added to the gear-center-distance of the machine frame that is illustrated in Fig. 1.

It will be observed that, in the present instance, the necessary eccentricity of the end-ring opening 22, with respect to the periphery of the end-ring, is opposite in sense in the two machines that are illustrated in Fig. 1 and in Fig. 2, respectively; that is to say, the longer dimension between one side of the opening 22 and the flat flange 4$^a$ is located on the right-hand side of the machine, according to Fig. 1, but on the left-hand side of the motor, referring to Fig. 2. Such change of location of the opening 22 is readily taken care of by providing both of the flat flanges 4$^a$ and 4$^b$ of the end-ring 4, as illustrated, and merely rotating the end-ring 180° from the position shown in Fig. 1 in order to properly accommodate the axle-bracket 5 of Fig. 2. More specifically stated, the flat flange 4$^a$ is employed to abut against, and to be secured to, the axle-bracket 5 in the machine that is shown in Fig. 1, whereas the other flange 4$^b$ is utilized for the axle-bracket connection in the motor that is shown in Fig. 2, whereby, in both cases, the housing-receiving openings 22 are concentrically located with respect to the polar projections.

It will be appreciated, without detailed description, that the end-ring 4 located at the other end of the machine frame is identical in form with the one illustrated and is suitably arranged to serve in a complementary sense thereto.

A suspension-bar 25 of a familiar form is shown as riveted to the main incasing member 1, and may also be attached to the end-rings 4, as set forth in the above-identified patent.

Fig. 3 illustrates another means for securing the advantages of my invention, namely, the use of the polar projections 7 on the right-hand side of the frame according to the conditions assumed in Fig. 2, and a pair of relatively long unitary polar projections 27 on the other or left-hand side of the main incasing member. Consequently, the same conditions obtain when a machine is constructed in accordance with Fig. 3 as are secured by the use of the motor that is shown in Fig. 2. Of course, a reversal of the locations of the polar projections 7 and 27 in Fig. 3 will produce a machine having the same gear-center-distance as the motor that is illustrated in Fig. 1.

Fig. 4 diagrammatically illustrates the use of my invention to produce a variation of "road-clearance" between the bottom of the motor frame and the road-bed or track surface. In this instance, the main incasing member 1 is provided with a plurality of the polar projections 7, and spacing-blocks 9 are located between the two lower polar projections 7 and the adjacent portions of the main incasing member 1. Thus, again taking the point 20 as the geometrical center of the incasing member, the effect of such location of the spacing-blocks 9 is to shift the center with respect to the polar projections; that is to say, the center of the armature shaft (not shown), a certain vertical distance above the point 20 to a point 30, or, in other words, the road clearance of the motor under consideration, has been increased by a vertical distance 20—30.

In Fig. 5, a method is shown for shifting the center of the armature shaft to one side of, as well as below, the geometrical center 20 of the main incasing member 1. Such a result is obtained in the present instance by providing a spacing block 9 between the upper right-hand polar projection 7 and the adjacent portion of the incasing member 1 and also providing spacing-blocks or filling members 29 between the upper left-hand and the lower right-hand polar projections 7 and the adjacent portions of the incasing member. Consequently, the center, with respect to the polar projections, is shifted a certain distance to the left of the vertical line passing through the geometrical center 20 by reason of the relative location of the spacing-block 9 and the right-hand spacing block 29, and is also shifted a predetermined amount below the horizontal line passing through the geometrical center 20 because of the relative placement of the spacing-block 9 and the upper-spacing block 29. Thus, the point 31 represents the new center of the armature shaft.

It will be understood, without further illustration or discussion, that the selected locations and radial lengths of the spacing blocks 9 and 29, or the equivalent, determine the gear-center-distance and also the road clearance of the motor, and the gear-center-distance or road clearance may thus be varied to any desired degree, either independently or concurrently, to meet operating conditions.

If it is desired to employ interpolar projections and field windings 10 and 11, respectively, in connection with the motor frames that are illustrated in Fig. 4 and Fig. 5, it will be understood that the dimensions of the polar projections should be suitably varied to conform to the new vertical position of the center of the armature shaft, and such variation of dimensions may be effected in either of the two ways illustrated herein; namely, by the employment of spacing blocks or of unitary polar projections of the proper length.

Furthermore, the end-rings 4, when employed in connection with any of the illustrated modifications of my invention, may be manufactured by different methods from that previously described, which permitted of a rotative movement of the end-rings to accommodate two different gear-center-distances of the machine. To provide a more universally applicable end-ring which will require a lesser number of parts, tools, etc., in the fabrication of a complete line of motors, the following scheme should be employed.

Only one of the flat flange portions $4^a$ or $4^b$ need be provided for each end-ring, and, after the initial location and arrangement of the polar projections have been fixed to suit the operating requirements of the particular case, the proper center of the end-ring opening 22 may be readily determined and the opening correspondingly machined; or a relatively small center opening may be initially provided and the edges thereof may be properly bored after determining the correct location of the opening 22 to provide the desired alinement with respect to the polar projection locations.

It has not been thought requisite in the present specification to set forth the necessity for variations of gear-center-distances and road clearances in order to meet operating requirements and to manufacture a complete line of motors, as such requirements will be readily appreciated by those skilled in the art.

It will be seen that I have thus provided a dynamo-electric machine structure having a certain number of coöperating parts, which, chiefly by process of rearrangement, produces variations of gear-center-distance or road clearance; or both, and, of course, the desired variation may be selected by suitably choosing the positions and the radial lengths of the filling members or spacing-blocks 9, or the relative lengths of the polar projections 7 and 27, as will be understood. Also, the fixed shape of the main incasing member 1 may be selected to conform more nearly to a regular polygon, or to any other suitable shape.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a dynamo-electric machine, the combination with an incasing member, of a plurality of main polar-projection members substantially equally spaced apart within said incasing member and unsymmetrically arranged with respect to the geometrical center of said incasing member.

2. In a dynamo-electric machine, the combination with an incasing member, of a plurality of pairs of polar-projection members unsymmetrically arranged with respect to the geometrical axis of said member.

3. In a dynamo-electric machine, the combination with an incasing member, of a plurality of polar-projection members arranged in unlike groups within said incasing member and symmetrical with respect to an axis other than the geometrical axis of said incasing member.

4. In a dynamo-electric machine, the combination with a frame member having its incasing wall substantially symmetrical with respect to an axis within the same, of a number of polar projections greater than two extending inwardly and radial to another axis that is parallel to the aforesaid axis.

5. In a dynamo-electric machine, the combination with an incasing member, of an axle-supporting member secured to one side of said incasing member, and a plurality of polar-projection members arranged to constitute unlike pairs of adjacent polar members along the sides of the incasing member, whereby the arrangement of said pairs determines the distance between the axle-supporting-member position and the center with respect to such members.

6. In a dynamo-electric machine, the combination with an incasing member, of an axle-bracket secured to one side of said incasing member, and a plurality of polar-projection members arranged to constitute two unlike pairs of similar adjacent projection members on the sides of the incasing member, whereby the location of one of said pairs of projection members on the axle-bracket side or on the opposite side of the incasing member respectively provides the machine frame with a relatively long or a relatively short gear-center-distance.

7. In a dynamo-electric machine, the combination with an incasing member, of a pair of end-members severally having eccentrically-located housing-receiving openings, means for connecting the main incasing member and the end-members, and a plurality of polar projection members arranged to constitute unlike pairs of similar adjacent projection members on the sides of the incasing member, whereby the arrangement of said pairs determines the proper rotative position of said end-members to cause said openings to be concentrically located with respect to the projection members.

8. In a dynamo-electric machine, the combination with an incasing member, of a pair of end-rings severally having eccentrically-located housing-receiving openings, means for connecting the main incasing member and the end-rings, said means including an axle-bracket located along one outer side of the frame, and a plurality of polar projection members arranged to constitute two unlike pairs of adjacent similar projection members on the inner sides of the incasing member, whereby the location of one of said pairs of projection members on the axle-bracket side or on the opposite side of the incasing member respectively requires the position of each end-ring to be correspondingly angularly adjusted to effect a concentric relation of said openings with respect to the projection members.

9. In a dynamo-electric machine, the combination with an incasing member, of a plurality of similar polar projections arranged within said incasing member, and spacing-blocks located between certain adjacent projections and the adjacent frame portions.

10. In a dynamo-electric machine, the combination with an incasing member, of an axle-supporting member secured to one side of said incasing member, a plurality of similar polar projections arranged adjacent to one another in pairs on the inner sides of said incasing member, and spacing-blocks located between the adjacent projections comprising one pair and the adjacent frame portions, whereby the arrangement of said blocks determines the distance between the axle-supporting-member position and the center with respect to said projections.

11. In a dynamo-electric machine, the combination of an incasing member, a plurality of main polar-projection members carried by said incasing member, and means for shifting the center, as defined by the said polar-projection members, with respect to the geometrical center of the said incasing member.

12. In a dynamo-electric machine, the combination with an incasing member, of a plurality of similar polar projections arranged within said incasing member, and spacing-blocks of different lengths located between certain projections and the adjacent frame portions.

13. In a dynamo-electric machine, the combination with an incasing frame member, of polar projections within said frame member and radial with respect to an axis parallel to, and spaced from, the geometrical axis of said frame member, whereby the center of the shaft of the armature mounted in said frame is shifted to one side of the geometrical axis of said frame member to change either the gear-center-distance or the road clearance of said machine.

14. In a dynamo-electric machine, the combination of an incasing member, a plurality of main polar-projection members carried by said incasing member, and means for shifting the axial center line, as defined by the arcuate faces of the said polar-projection members, relative to the geometrical axial line of said incasing member.

15. In a dynamo-electric machine, the combination of an incasing member, a plurality of main polar-projection members carried by said incasing member, and means for shifting the center, as defined by the said polar-projection members, radially with respect to the geometrical center of the said incasing member.

16. In a dynamo-electric machine, the combination of an incasing member, a plurality of main polar-projection members carried by said incasing member, and means for shifting the center, as defined by the inner faces of the said polar-projection members, relative to the geometrical center of the said incasing member.

17. The combination with an incasing member, of a plurality of polar projections therein having arcuate faces which determine an axis that is not coincident with the geometrical axis of said member.

18. The combination with an incasing member, of a plurality of polar projections therein which, when shifted angularly relatively to said member, shift the axis determined by the faces of said projections relatively to the geometrical axis of said incasing member.

In testimony whereof, I have hereunto subscribed my name this 25th day of Oct. 1916.

CHARLES W. STARKER.